UNITED STATES PATENT OFFICE.

KATHARINE L. JEWELL, OF NEW YORK, N. Y., ASSIGNOR TO DANIEL A. LORING, OF SAME PLACE.

IMPROVEMENT IN PRESERVING OYSTERS.

Specification forming part of Letters Patent No. 215,628, dated May 20, 1879; application filed February 18, 1879.

*To all whom it may concern:*

Be it known that I, KATHARINE L. JEWELL, of the city, county, and State of New York, have invented certain new and useful Improvements in the Process of Preserving Oysters and in the article of manufacture produced thereby; and I do hereby declare that the following specification is such a full, clear, and exact description thereof as will enable others skilled in the art to which my improvements pertain as to comprehend and practice the same.

My said invention consists in a process of preparing oysters for the market, whereby the same may be packaged and kept for long periods of time without deterioration, said invention also including the improved article of manufacture which I call "jellied oysters," all of which will more fully hereinafter appear from the subjoined description.

Attempts have heretofore been made to prepare oysters so that the same may be preserved during long periods of time and in different climates, such preparation or process consisting in scalding or partially cooking the oysters, then placing them in a suitable vessel and covering them with a hot liquid composed of oyster-liquor and vinegar which have been boiled together for a short period, to which liquid is sometimes added spices.

This process is defective for many reasons: The oysters may move freely in the said liquid, and thus when frequently moved in transportation or handling become broken by rubbing against each other. When the oysters are simply scalded the vinegar soon acts upon their tissues, thus partially decomposing them and soon rendering them soft and unsuitable to be eaten. When the oysters are cooked they become shriveled up, hardened, unsightly, and unpalatable.

By my process I retain the fullness, fresh condition, and natural appearance of the oyster, and yet so preserve it that it will continue in the condition resulting from its first treatment for a long period of time without deterioration.

In carrying out my said improvements I prepare a quantity of freshly-opened oysters by first so far cooking them as to plump them—that is, subject them for such a period of time in their own liquor, or it may be in hot water, as to coagulate their exterior surface, and thus retain their interior juicy condition, whereby they are left full and plump as when first removed from the shell, or nearly so. Having placed them in the vessel in which they are to be put up for preservation, I pour over them a liquid prepared as follows: A suitable quantity of oyster-liquor containing a sufficient number of fresh oysters for the purpose, as may readily be determined by slight experience, is boiled until so much of the gelatinous matter from the oysters is extracted for the purpose, when the bodies of the oysters are removed, and said liquor is so far inspissated as to produce a jelly when the same is cooled. To this liquor is added a quantity, about its equal in bulk, of heated vinegar, to which may be added spices to suit the taste. This liquor is poured over the plumped oysters (preferably while they are still heated) so as to cover them, and it will, when properly cooled, be converted into a jelly sufficiently hard to support the oysters, and form with them a semi-solid mass, which will be impervious to air and not liable to injury from exposure or transportation. The oysters will thus become enveloped by the jelly, and cannot be moved about therein to injure each other by forcible contact, their natural plumpness being thus perfectly preserved.

The jelly, while hot and fluid, may be strained to render it clear, and after it has been poured over the oysters the vessel containing the mass may be set in hot water to drive out air-bubbles therefrom, as is common in the art of preserving.

In carrying out my improvements I have found the following to be a good formula: Cook or plump one quart of freshly-opened oysters in their own liquor, and then remove the oysters and place them in a suitable vessel. Boil three pints of freshly-opened oysters from three to four hours in their own liquor over a slow fire, or until the gelatinous matter from the oysters is extracted, remove the bodies of the oysters, and add to the liquor a quantity equal to its bulk of boiled vinegar, and pour the same over the plumped oysters, whereupon, when the mass is cooled, the liquor will be converted into jelly, and the whole thus form a semi-solid mass, which I call "jellied oysters."

I do not confine myself to these proportions or periods of time, as the same may be varied within wide limits.

By my process this most desirable article of food is perfectly preserved in its prime or natural condition, and may be transported to localities remote from the sea-board, and be kept for long periods of time without losing its natural flavor and form or becoming deteriorated; and when the mass is removed from its vessel it forms a solid compact body, capable of supporting itself upon a plate, and thus forming an ornamental dish for the table.

Having now described my invention and set forth the merits it possesses, what I claim as new, and desire to secure by Letters Patent, is—

1. The process of preserving oysters, which consists, essentially, in first so far cooking as to plump them, then enveloping them with a liquor obtained from oysters, substantially in the manner described, which on mere cooling becomes a jelly, as set forth.

2. As a new article of manufacture, plumped oysters enveloped in a jelly derived from oysters.

In testimony whereof I have signed my name to this specification in the presence of two subscribing witnesses.

KATHARINE L. JEWELL.

Witnesses:
FRED. S. ADAMS,
T. J. M. JEWELL.